United States Patent [19]
Sullivan

[11] Patent Number: 6,041,537
[45] Date of Patent: Mar. 28, 2000

[54] BAIT DELIVERY SYSTEM

[75] Inventor: Timothy Joseph Sullivan, Orange, Calif.

[73] Assignee: Timothy J. Sullivan, Orange, Calif.

[21] Appl. No.: 08/980,155

[22] Filed: Nov. 26, 1997

[51] Int. Cl.[7] .................................................. A01K 91/02
[52] U.S. Cl. ........................ 43/26.1; 114/255; 114/61.1
[58] Field of Search .............................. 43/26.1; 114/255, 114/144 A, 61.1; 446/154, 162, 165

[56] References Cited

U.S. PATENT DOCUMENTS

| | | | |
|---|---|---|---|
| 3,710,500 | 1/1973 | Pena | 43/26.1 |
| 4,635,391 | 1/1987 | Early | 43/26.1 |
| 5,154,016 | 10/1992 | Fedora et al. | 43/26.1 |
| 5,581,932 | 12/1996 | Bell | 43/26.1 |
| 5,806,232 | 9/1998 | James | 43/26.1 |

*Primary Examiner*—Ed L. Swinehart

[57] ABSTRACT

This vessel is a remote controlled pontoon-style boat. The port and starboard pontoons make up the bait holding bays with servo-actuated extraction doors located on the stern of each pontoon. This vessel is used in conjunction with normal fishing gear i.e., rod, reel, bait, and/or, lures. The extraction door is opened and the bait is inserted into the bait bay. The door is then closed and the vessel is set afloat and sent underway. When the vessel has reached your optimum fishing spot, the extraction door is opened via remote control and the bait is set loose. Fishing is then carried out in the normal way. The advantage of this bait delivery vessel is that its only limitation is the amount of line your reel will hold. The bait delivery vessel can deliver your bait with far greater accuracy and distance than normal bait casting and without the high price of a full-sized fishing boat.

1 Claim, 3 Drawing Sheets

NOTE : VIEW SHOWN WITH SIDE PONTOON ELIMINATED.

BAIT DELIVERY SYSTEM

BACKGROUND

This invention relates in general to fishing and in particular to remote controlled pontoon-style bait delivery vessels.

During a fishing excursion to one of the local fishing holes, bait casting from the bank which has a very limited range, I thought to myself that it would be great to be able to fish the whole lake without having to buy a high priced boat.

With a remote controlled pontooned-style bait delivery vessel I am now able to deliver my bait anywhere on the lake, fishing from the bank for only a small fraction of the cost of buying a fishing boat.

SUMMARY

A bait delivery vessel according to one embodiment of the present invention comprises a remote controlled-pontoon style vessel with bait holding bays and bait extraction doors for delivering bait.

One object of the present invention is to provide a bait delivery vessel having bait delivering capabilities for far greater distance and accuracy than normal bait casting.

Related objects and advantages of the present invention will be apparent from the following description.

DRAWING BRIEF

TOP and SIDE VIEW of a remote controlled pontoon-style bait delivery vessel according to a typical embodiment of the present invention.

Figure 1:
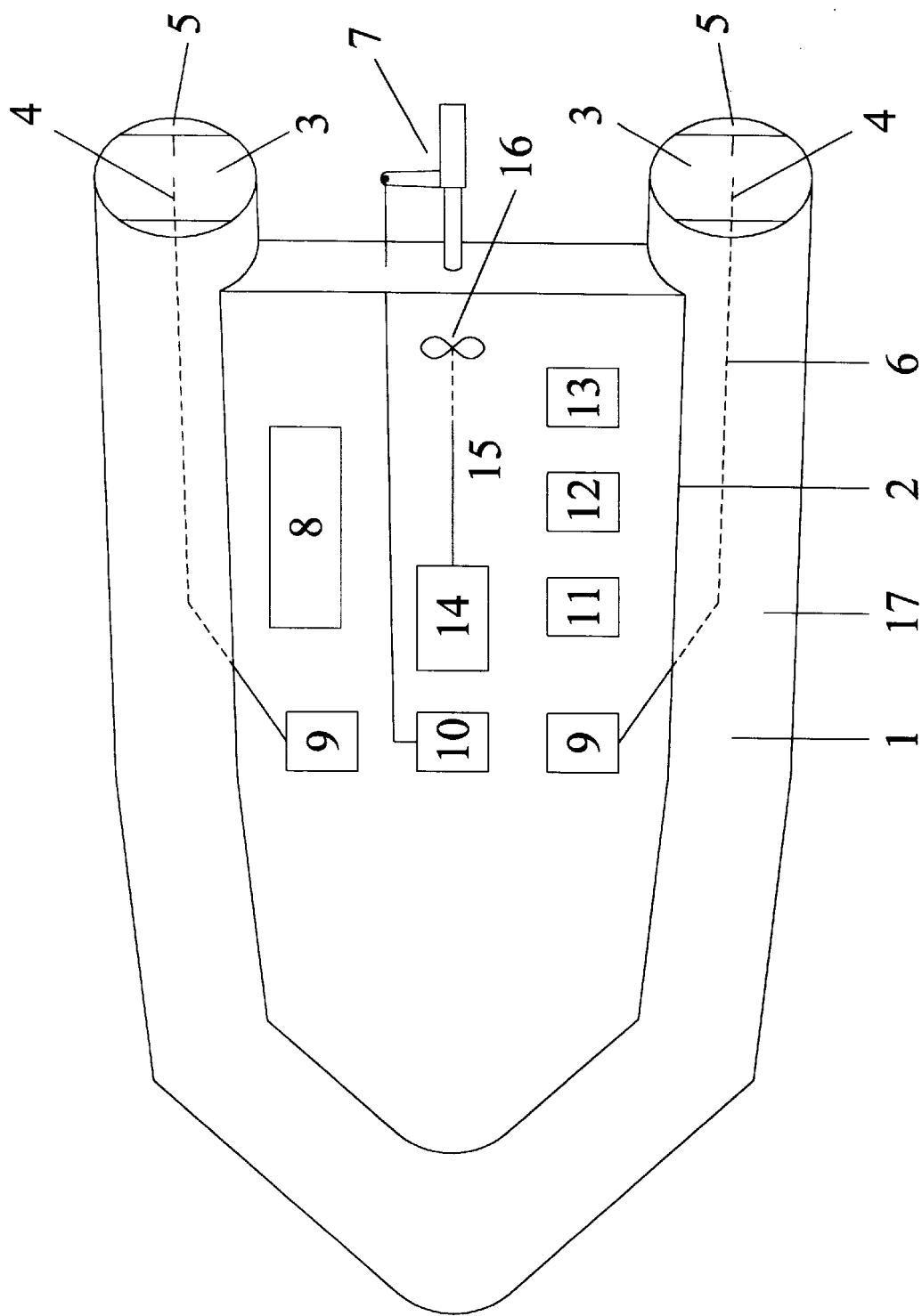
FIG. 1 is a section top view of the bait extraction door.
Figure 2:
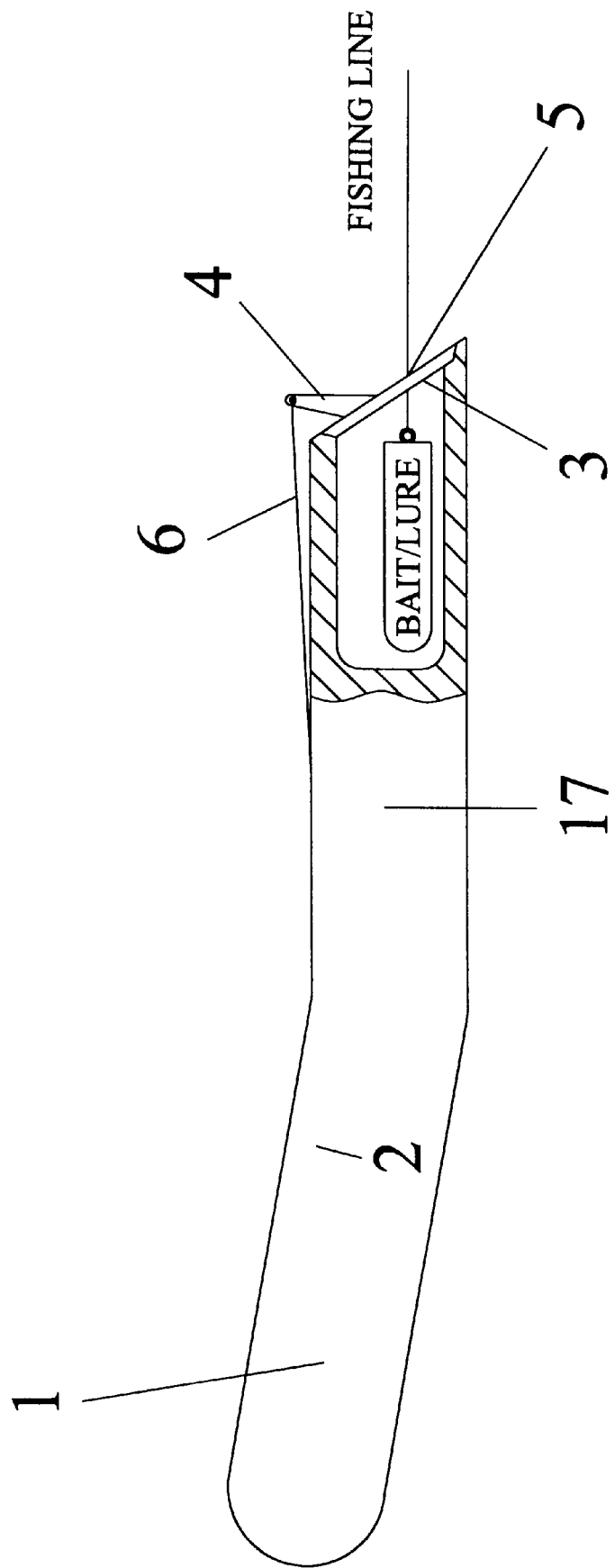
FIG. 2 is a section side view of the motor bay, rudder mechanism, propshaft, and prop.
Figure 3:
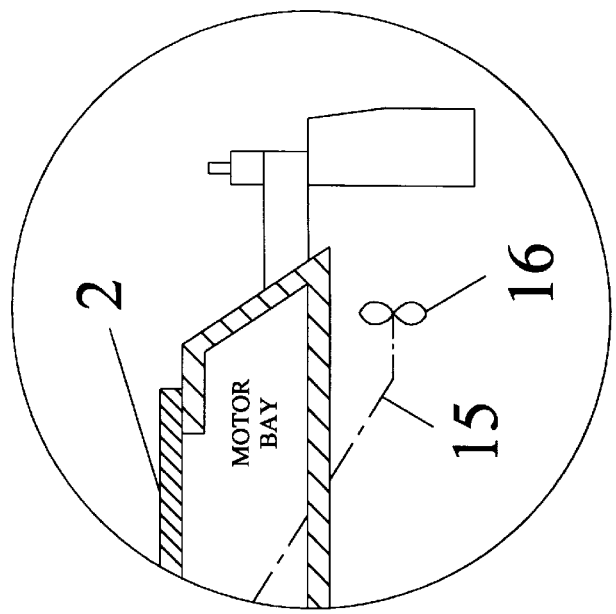
FIG. 3 is a section side view of the bait holding bay and extraction door.
Figure 3:
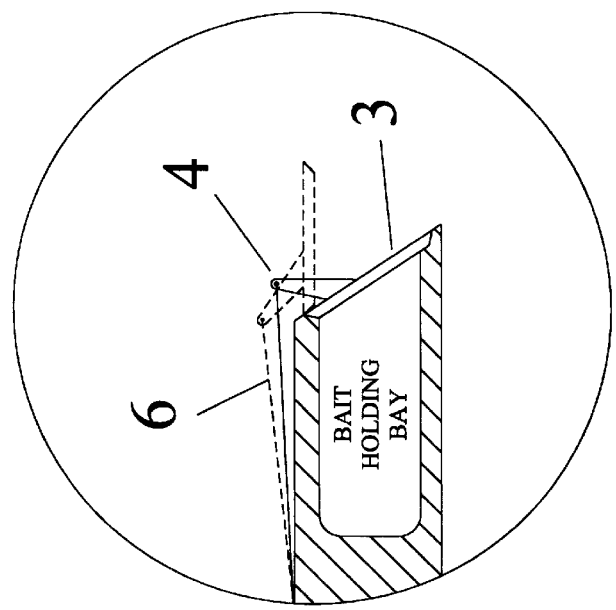

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to the TOP VIEW and SIDE VIEW, there is illustrated a remote controlled pontoon style bait delivery vessel. The outer hull assembly 1 is constructed of three inch diameter cardboard mailing tubes cut at various degrees and secured together with epoxy. The bottom and transom are of basswood and are cut to fit the outer hull assembly 1 and secured to same with epoxy. The cover assembly 2 is of basswood and is cut to fit the outer hull assembly 1 and is secured to same with fasteners. Bait holding bays 17 and basswood bait extraction doors 3 are comprised in part of the rear halves of the outer hull assembly 1. Operation of the bait extraction doors 3 is controlled via the extraction door servos 9 connected to control rods 6 which is connected to control arms 4 which is secured to the bait extraction doors 3 with fasteners. Bait extraction doors 3 has a fishing line feed through 5 cut in the bottom middle of same. Vessel is then fiberglassed over to ensure waterproofing and structural rigidity. Bait delivery vessel is used in conjunction with normal fishing gear i.e., rod, reel, bait, and/or lures. Bait extraction door is opened and bait is inserted into bait holding bay 17 door is closed with fishing line inserted through fishing line feed rough 5. Bait delivery vessel is then set afloat enabling the fisherman to distribute the bait with far greater accuracy and distance than is normally achieved through bait casting. Power distribution is achieved through motor 14 motor battery 8 motor control 11 propeller shaft 15 and propeller 16. Steering is controlled via the rudder mechanism 7 steering servo 10. All servos are controlled through the receiver 12 and receiver battery 13.

Optimum materials and dimensions will depend in part on local availability and different manufacturing processes.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. In combination:

a remote controlled bait delivery fishing vessel for delivery of fishing line attached bait to a desired fishing location, comprising;

at least one bait holding bay formed in a stern portion of the vessel, each said bay including a top hinged stern mounted bait extraction door, means for opening each said bait extraction door, including a receiver, a control arm and a control servo, and each said bait extraction door having a fishing line feed through slot located at a bottom middle portion thereof for passage of a fishing line attached to said bait.

* * * * *